July 28, 1959  J. J. SPICER, JR  2,897,305
TREADLE TYPE VEHICLE TURN INDICATING EQUIPMENT
Original Filed Aug. 25, 1955  3 Sheets-Sheet 1
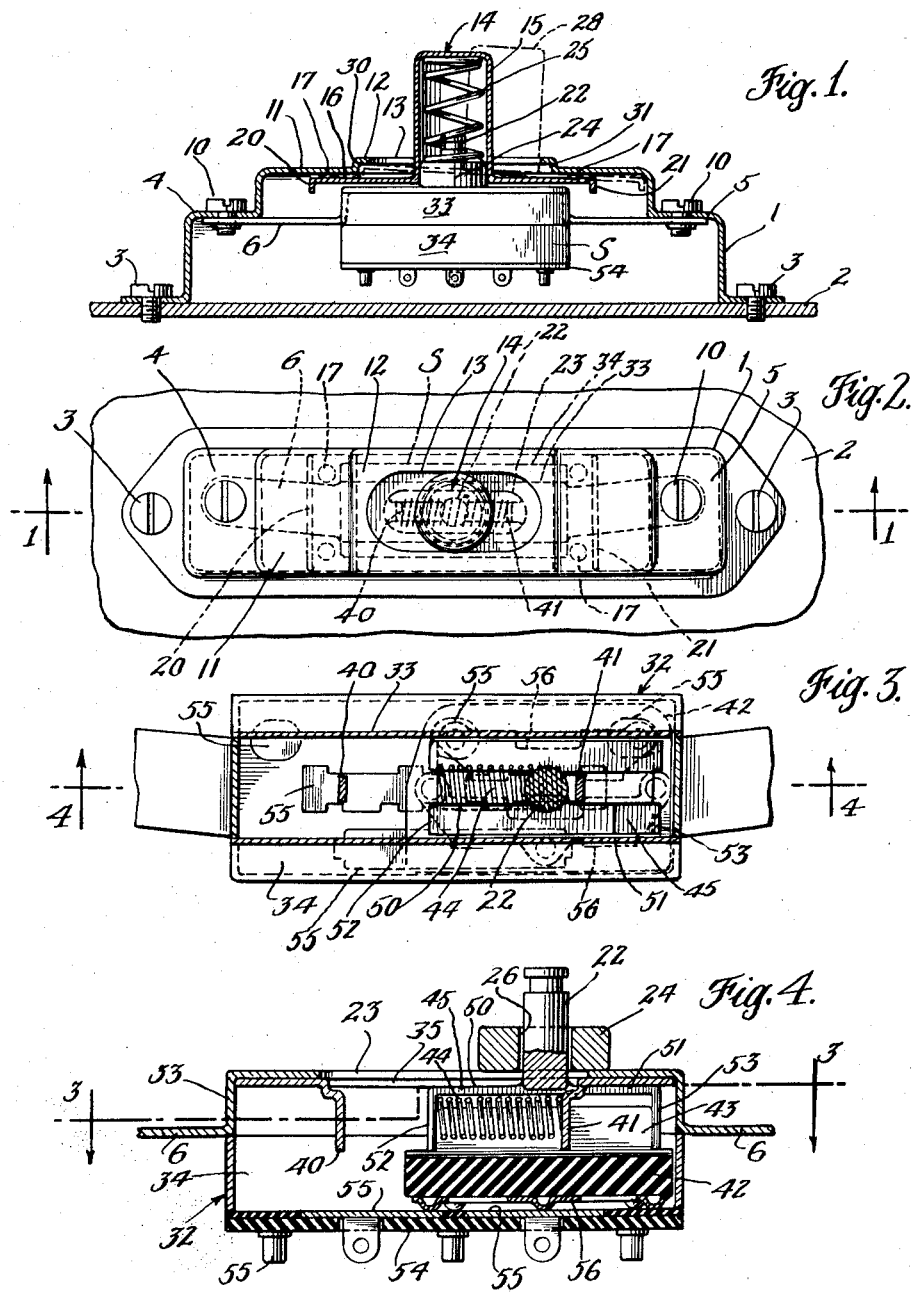

July 28, 1959     J. J. SPICER, JR     2,897,305
TREADLE TYPE VEHICLE TURN INDICATING EQUIPMENT
Original Filed Aug. 25, 1955     3 Sheets-Sheet 2
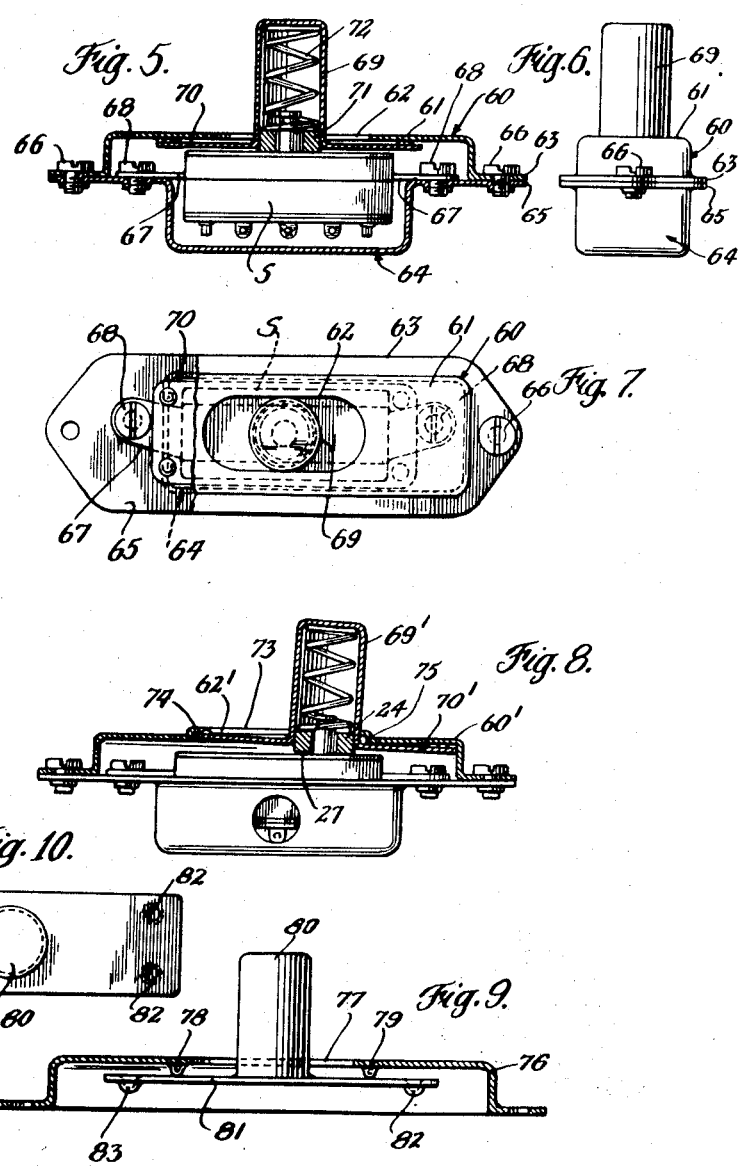

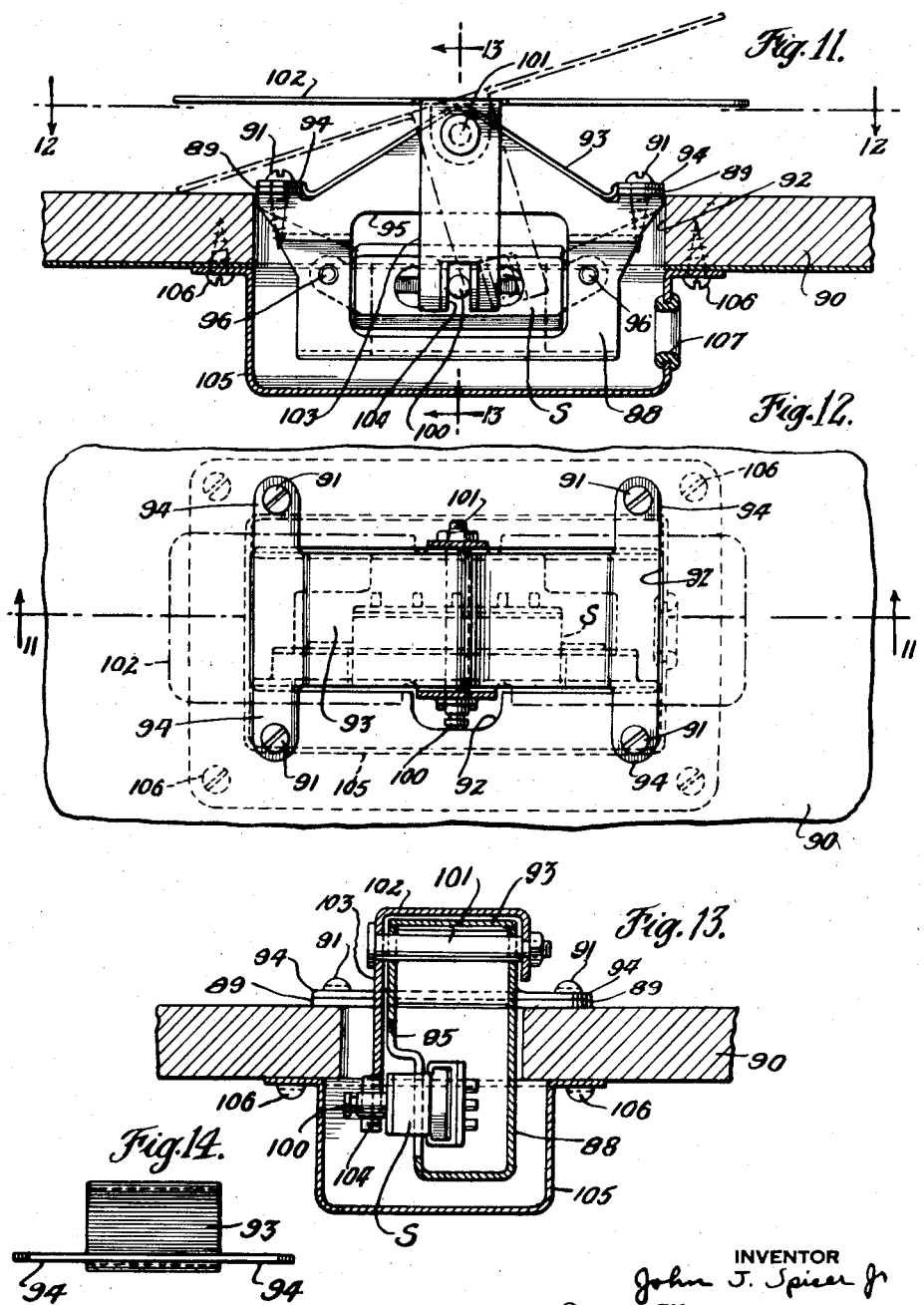

United States Patent Office 2,897,305
Patented July 28, 1959

2,897,305

TREADLE TYPE VEHICLE TURN INDICATING EQUIPMENT

John J. Spicer, Jr., Philadelphia, Pa., assignor to Industrial Enterprises, Inc., a corporation of New York Original application August 25, 1955, Serial No. 530,556, now Patent No. 2,846,533, dated August 5, 1958. Divided and this application February 17, 1958, Serial No. 715,785

1 Claim. (Cl. 200—61.29)

This invention relates in general to vehicle turn indicating equipment and, in particular, relates to means actuable by an operator to initiate a turn signal. This application is a division of my application Serial No. 530,556, filed August 25, 1955, now Patent No. 2,846,533.

Many vehicles such as passenger cars and trucks are provided with mechanism adapted to flash signal lights on the front and rear of the vehicle when a turn is to be made either in the left or right-hand direction. Such equipment may include in general certain electrical components making up the circuits of the system, a switch for interconnecting certain of the circuits to cause the desired flashing, together with mechanical means actuable by the driver to operate the switch. The present invention is concerned with the latter mentioned portion of such equipment and, in its preferred form, is concerned with the combination of a switch and the means for actuating the same. The apparatus of the invention is adapted to be actuated by the foot of the vehicle operator and is of the non-self-cancelling type.

It is one object of the invention to provide for a vehicle turn indicating system, a signal initiating device to be connected with the floor board of a vehicle and actuated by the foot of an operator, the device having a structure adapted to protect a switch associated therewith from contact with foreign matter often times present in and about the vehicle floor board.

Another object of the invention is to provide for a vehicle turn indicating system, a foot-operated signal initiating device which is adapted to be releasably held in a turn indicating position without the aid of the foot of the operator.

Another object of the invention is to provide in a vehicle turn indicating system, a foot-operated signal initiating device which is adapted to be releasably held in a turn indicating position without the aid of the foot of the operator and which can be automatically returned to a neutral position by the mere touch of the foot of the operator.

Another object of the invention is to provide for a vehicle turn indicating system, a signal initiating device equipped with a treadle to be depressed by the foot of the operator during a turn and automatically returnable to a neutral position when the foot is released after a turn.

Another object of the invention is to provide for a vehicle turn indicating system, a signal initiating device having a minimum number of parts or components and more particularly, such a device including a switch, a one piece body which supports the switch, and a one piece treadle pivotally mounted on the body for actuating the switch.

Another object of the invention is to provide for a vehicle turn indicating system, a strong, rugged, foot operated signal initiating device whose parts can be made by drawing and stamping operations and, therefore, be inexpensive to produce.

Certain other objects and advantages of the invention will be apparent from the following description and drawings wherein:

Figure 1 is a longitudinal section taken on the line 1—1 of Figure 2 with the device appearing in elevation;

Figure 2 is a plan view of Figure 1;

Figure 3 is an enlarged plan section of the switch unit of the device as taken on the line 3—3 of Figure 4;

Figure 4 is a longitudinal section taken on the line 4—4 of Figure 3;

Figure 5 is a longitudinal section of a modification;

Figure 6 is an end view of Figure 5;

Figure 7 is a plan view of Figure 5;

Figure 8 is a longitudinal section of a modification showing the actuating member releasably held in the actuating position;

Figure 9 is a sectional elevational view illustrating another modification;

Figure 10 is a plan view of the actuating member of Figure 9;

Figure 11 is a sectional elevational view illustrating a modification of the invention taken on the line 11—11 of Figure 12;

Figure 12 is a plan section taken on the line 12—12 of Figure 1;

Figure 13 is a cross section taken on the line 13—13 of Figure 11; and

Figure 14 is a fragmentary end view of a portion of the device of Figure 11.

In Figure 1 I have shown one embodiment of the invention where a housing 1 is adapted to be secured to the floor board 2 of a vehicle as by the screws 3—3 and has shoulders 4 and 5, to which is secured a bracket 6 as by the screws 10—10. The bracket 6 is adapted to support a switch S.

The top portion 11 of the housing is substantially flat, the central part 12 thereof being raised and provided with an elongated slot 13. It will be observed that the housing 1, as mounted on the floor board, is entirely closed except for the slot 13.

An actuating member generally indicated by 14 has a hollow post 15 disposed in the slot 13 and a substantially flat slider portion 16 having bosses 17—17 bearing against the underside of top portion 11. The opposite ends of the slider are bent downwardly as indicated at 20 and 21.

The switch S has an operating stud 22, which extends through an elongated slot 23 in the bracket 6 (Figure 2) and upwardly (Figure 1) into the hollow post 15. A washer 24 disposed over the stud 22 rests on the bracket 6 and is disposed at the mouth of the hollow post 15. A spring 25 bears between the washer and the top of the post 15 and operates to urge the slider portion 16 up against the top portion 11 of the housing. The purpose of the washer is to transmit motion as between the stud and post and to provide a bearing surface for the spring. As indicated in Figure 4, the hole 26 in the washer which receives the stud is somewhat oversized to provide for a slight tipping motion of the washer, as is indicated by the numeral 27 in Figure 8.

As will be commented on more in detail later, the position of the stud 22 controls the manner in which the switch S operates to interconnect circuits of the turn indicating system. When the stud is moved to the left or right as viewed in Figure 1, the switch effects the flashing of lights to indicate a left turn or a right turn as the case may be. The stud may be moved to the left or right by movement of the post. In Figure 1 the post 15 is shown in a neutral or center position and is adapted to be engaged by the foot of the operator and moved to the left or right for the purpose of initiating the desired turn signal.

When the post is moved, say, to the right as indicated in Figure 1 by the dotted lines 28, the bent over portion 20 of the slider 16 is forced upwardly by the spring 25 into the detent or recess 30 provided by the raised portion 12. When the post is moved to the left, the bent over portion 21 engages the detent or recess 31. In either position, the post is releasably held in position and the foot may be disengaged from the post. When the turn is completed and the post is to be returned to neutral, the top of the post is slightly depressed with the foot, which moves the bent over portion out of its corresponding detent and the post is automatically returned to neutral as is explained following.

In the embodiment of Figure 1, the portion of the housing just above the ledges 4 and 5, together with the bent over portions 20 and 21, can be arranged to accommodate return springs respectively disposed therebetween. I prefer, however, that the return spring or springs be an integral part of the switch S. One type of switch ideally suited for such a purpose is disclosed in my application Serial No. 352,481, filed May 1, 1953, entitled Switch for an Automobile Turn Indicating System, now abondoned. This switch will be described briefly below for an understanding of its return operation.

As seen in Figures 3 and 4, the switch has a housing 32 channel-shaped in cross section with the upper part 33 being narrower than the lower part 34 (also see Figure 2). The top of the housing has an elongated slot 35 which, as seen in Figure 4 is just below the slot 23 in the bracket 6. Both of these slots accommodate the stud 22 and also expose the interior of the switch. At the opposite ends of the slot 35 are abutments 40 and 41. Within the housing is a carrier 42 having a slot 43 in which is disposed a spring 44. When the switch is in neutral position (centered as between the abutments 40 and 41), the spring is expanded and bears on these abutments. On the top of the carrier is a slider 45, to which is secured the stud 22. The slider has slots 50 and 51 which permit it to be moved past either abutment 40 or 41. The ends of the slider are arranged to overlie the ends of the carrier and the ends of the spring as indicated at 52 and 53 in Figure 3.

When the stud 22 is moved to the right, the lefthand end of the slider pulls the carrier to the right and grabs the spring and compresses the same against the abutment 41. This is shown in Figure 4. The slider moves past the abutment 41 by virtue of the slot 51 and the carrier also moves past this abutment by virtue of the slot 43. In this position, if the force on the stud 22 is released, the spring 44 will cause the slider, stud and carrier to move back to the neutral or center position. The same type of action obtains if the stud is moved from neutral to the left-hand side.

The housing 34 of the switch is provided with an insulated base 54, which has a plurality of fixed terminals generally indicated by the numerals 55. As seen in Figure 4, these fixed terminals are generally flush with the one side of the base and extend therethrough to the outside, where they are adapted to be connected to the various circuits making up the turn indicating system. The carrier is provided with bridging contacts generally indicated by the numerals 56—56. As fully explained in the above-mentioned copending application, when the switch is in the neutral position, the bridging contacts interconnect certain of the fixed terminals, and when the switch is moved to either the left for right settable position, the bridging contacts interconnect certain of the fixed terminals for the purpose of indicating a turn signal.

As has been mentioned heretofore, it is important in foot-operated turn signal devices to keep foreign matter out of the switch associated therewith in order to prevent the switch contacts being rendered wholly or partially inoperative or the switch otherwise damaged. The above-described structure accomplishes this objective, as will be apparent from the following.

The bosses 17—17 on the slider 16 are shown somewhat exaggerated in size and, in practice, are made relatively small, for example, in the order of a few thousandths of an inch, so that the slider is just slightly spaced from the underside of the portion 11. The slider is kept in the spaced condition by the action of spring 25. Also, the extent to which the raised portion 12 protrudes outwardly from the portion 11 is somewhat exaggerated. The foregoing arrangement, although providing for movement of the slider and post, makes for a close fit between the top of the slider and the underside of the portion 11. Further, it will be apparent from an inspection of Figure 2 that the slider portion covers an area much greater than that of the switch and, more particularly, that of the slot 35, which exposes the interior of the switch.

The close fit between the slider 16 and the portion 11 as above mentioned provides an arrangement which is highly resistant to the entry of dust or dirt. Coupled with this is the fact that the slider portion forms a protective area about the slot 23. Thus, even if foreign matter found its way through the space between the slider and the portion 11, it would merely drop into the housing 1 and be prevented from dropping into the slot 23 due to the protective cover of the slider.

In Figures 5, 6 and 7 I have shown another embodiment of the invention which is adapted to fit in a recess into the floor board of the vehicle, and in which the detenting means for holding the switch in a settable position are not used.

The switch has a housing 60, the top portion 61 of which is substantially flat and has an elongated slot 62. The housing also is provided with a peripheral lip 63. Another housing 64 has a peripheral lip 65, which is connected with lip 63 as by the screws 66—66 and also mounts the bracket 67 supporting the switch S, the bracket being secured as by the screws 68—68, which may be adapted to secure the unit to the vehicle floor board. The actuating member for the switch includes the post 69 and slider 70, together with the washer 71 and spring 72, which are arranged similarly as heretofore described.

In this embodiment, when the post 69 is moved to the left or right-hand position to energize the respective lights for indicating a turn, the foot must remain in contact with the post until the turn is completed. Then the foot is released and the switch returns to neutral position in a manner previously described.

In Figure 8 I have shown an embodiment similar to that of Figure 5 except that recesses are provided to yieldably maintain the switch in either of the settable positions.

The upper housing 60' has a raised portion 73 which forms the recesses or detents 74 and 75 at the opposite ends of the slot 62'. When the post 69' is moved, say, to the right, the left-hand end of the slider portion 70' moves into the detent 74 and holds the switch in position. For returning the switch to neutral, the post 69' is slightly depressed by the foot.

In Figures 9 and 10 I have shown an alternative way of providing the detenting action for any of the embodiments of the switch heretofore described. The top part of a housing 76 has a slot 77 and adjacent each end thereof are pairs of dimples, one dimple in each pair being indicated respectively by the numerals 78 and 79. The post 80 is disposed in the slot 77 in the usual manner and the slider portion 81 is provided with corresponding pairs of dimples 82—82 and 83—83 as shown in Figure 10.

In Figures 12 through 14 I have shown a modification of the foot-operated device of the invention. This is described following.

As seen in Figure 13 a generally U-shaped housing or frame 88 is provided with outwardly projecting ears 89—89, by means of which the housing is adapted to be connected to a floor board 90 of a vehicle, for example, as by the screws 91—91. The floor board has an aperture 92 which is cut to accommodate the housing and is formed so as to provide a substantially close fit. On the top of the housing over the mouth of the U is disposed a cover plate 93 which has projecting ears 94—94 and is secured in place as by the screws 91—91 (see Figure 14 for an end view of the cover). The purpose of the cover plate is to prevent foreign matter from dropping into the housing when the device is mounted in a vehicle.

One side of the housing has an aperture 95 and a switch S extends across the aperture and is secured to the housing as by screws 96—96. Preferably the switch S is of the type mentioned heretofore and the operating stud 100 projects away from the aperture, as is clearly seen in Figure 13. At the top of the housing just below the cover plate is disposed a pivot 101 and this pivot carries a treadle 102. The treadle has a downwardly extending arm 103 provided with a slot 104 engaging the operating stud 100.

The spring arrangement in the switch S is adapted to center the treadle in the position shown by the full lines in Figure 11. When a signal is to be initiated, the left or right-hand side of the treadle is depressed by the foot of the vehicle operator. For example, when the left-hand side of the treadle is depressed, the treadle is rotated about the pivot 101 to move in a counter-clockwise direction to the position shown by the dotted lines and the operating arm 103 moves the stud 100 to the right so as to interconnect the desired signalling circuits. After a turn is completed and the foot removed, the treadle is returned to the position shown by the full lines.

Preferably the device on the underside of the floor board is protected by the box-like cover 105 secured to the board by the screws 106—106. The cover 105 has a hole carrying a grommet as indicated at 107, which provides an entry for the electrical connectors to the switch.

I claim:

A foot-operated device for a vehicle turn signal system comprising: a generally U-shaped housing, the mouth of the U being oriented upwardly and one side of the U being arranged to form an aperture; a cover plate disposed over the mouth of the U-shaped housing; a control switch mounted inside of said U-shaped housing including a switch housing inside of which are mounted an insulated base with a plurality of fixed terminals, a movable carrier means mounted on the base and having a neutral position and two settable positions, the carrier means having bridging contacts adapted to engage said fixed contacts in a predetermined manner in said positions, an operating stud projecting outwardly of the switch housing and through said aperture and a spring to normally urge said carrier means to said neutral position; a pivot extending between the sides of said U-shaped housing near the top thereof; a treadle mounted on said pivot and having a downwardly extending arm provided with a slot engaging said operating stud, the treadle being adapted to be depressed by the foot of the operator whereby to move the carrier means from neutral to either settable position, said spring returning said carrier means to said neutral position when the operator's foot is released from the treadle.

References Cited in the file of this patent

UNITED STATES PATENTS

| | | |
|---|---|---|
| 1,847,407 | McManaman | Mar. 1, 1932 |
| 2,301,583 | Rodrick | Nov. 10, 1942 |
| 2,636,092 | Schneider | Apr. 21, 1953 |
| 2,695,343 | Howard | Nov. 23, 1954 |